United States Patent [19]
Takeda et al.

[11] Patent Number: 5,860,355
[45] Date of Patent: Jan. 19, 1999

[54] AUTOMATIC BREAD MAKER

[75] Inventors: Shoichi Takeda; Makoto Nasu; Yuji Takatsu, all of Nagano-ken, Japan

[73] Assignee: MK Seiko Co., Ltd., Nagano-ken, Japan

[21] Appl. No.: 954,311

[22] Filed: Oct. 20, 1997

[30] Foreign Application Priority Data

Feb. 21, 1997 [JP] Japan .................................... 9-054024
Aug. 7, 1997 [JP] Japan .................................... 9-227229

[51] Int. Cl.⁶ .............................. A47J 27/00; A47J 37/00; A47J 37/01
[52] U.S. Cl. ................................. 99/327; 99/332; 99/348; 99/352; 99/468; 366/98; 366/146; 366/314; 366/601
[58] Field of Search ............................. 99/348, 467, 468, 99/325–328, 331–335, 483–486, 352; 366/69, 96–98, 144–146, 149, 314, 601; 426/504, 512, 523; 364/400

[56] References Cited

U.S. PATENT DOCUMENTS

| | | | |
|---|---|---|---|
| 4,776,265 | 10/1988 | Ojima | 99/348 |
| 4,836,683 | 6/1989 | Aoyama | 366/98 |
| 4,903,587 | 2/1990 | Nagasaka et al. | 99/325 |
| 4,903,589 | 2/1990 | Aoyama | 99/331 X |
| 4,984,512 | 1/1991 | Takahashi et al. | 99/327 |
| 5,076,153 | 12/1991 | Takahashi et al. | 99/327 |

Primary Examiner—Timothy F. Simone
Attorney, Agent, or Firm—Greenblum & Bernstein, P.L.C.

[57] ABSTRACT

An automatic bread maker comprises: an oven chamber having a heater, a kneader and a temperature sensor; a bread vessel mounted within the oven chamber, ingredients being charged into the bread vessel; and controller for controlling the heater so as for a temperature within the oven chamber, which is detected by the temperature sensor to be maintained at a fermentation temperature.

11 Claims, 4 Drawing Sheets

AUTOMATIC BREAD MAKER

BACKGROUND OF THE INVENTION

This invention relates to an automatic bread maker in which bread can be automatically made merely by charging ingredients including flour, yeast and water, into a vessel.

In an already-known device of this type, a predetermined amount of ingredients is put into a vessel, and when a desired bread-making course is selected, a bread-making process, comprising a kneading step of kneading dough, a fermentation step of fermenting the dough, a degassing step of deflating the expanded dough, a shaping-fermentation step of expanding the dough into a shape of the bread, and a baking step of baking the expanded dough, is automatically performed, thereby making the bread.

In such a device, however, since the independent steps of the process, including the kneading step and the fermentation step, were sequentially effected, it took at least about 4 hours to about 2 hours to complete the bread-making process, and therefore considerable time was required, including the time for the preparation of the material, before the bread could be eaten.

And besides, in order to make bread in a short time, it is necessary to accurately control the temperature of the material at a starting stage, and particularly whether or not the bread can be made satisfactorily depends greatly on the temperature of the prepared water. Therefore, the user need to change the temperature of the water to be set, depending on the season. However, these are adjusted based on the temperature which the user can know through an indoor thermometer or the like, and the temperature within an oven chamber of the bread maker is not detected, and therefore there has been encountered a problem that the accurate temperature control can not be effected, so that bread can not be made satisfactorily.

SUMMARY OF THE INVENTION

It is therefore an object of this invention to provide an automatic bread maker in which a bread-making time is so reduced that bread can be made in a short time (about one hour).

The above object has been achieved by an automatic bread maker of the present invention comprising: an oven chamber having a heater, a kneader and a temperature sensor;

a bread vessel adapted to be mounted within the oven chamber, ingredients being charged into the bread vessel; memory means storing a high-speed bread-making course in which a kneading step of kneading dough while maintaining a temperature within the oven chamber at a fermentation temperature, a fermentation step of fermenting the dough while maintaining the temperature within the oven chamber at a fermentation temperature substantially equal to the fermentation temperature of the kneading step, and a baking step of baking the dough after the fermentation step is finished are sequentially effected; selection means for selecting the high-speed bread-making course from the memory means; and control means for controlling the heater and the kneader in accordance with the temperature within the oven chamber, detected by the temperature sensor, when the high-speed bread-making course is selected by the selection means.

There is provided display means for displaying that step in the process of being effected, a bread-making time and so on, and there is provided control means which computes a temperature of water, constituting part of the ingredients, in accordance with the temperature within the oven chamber, detected by the temperature sensor, when the high-speed bread-making course is selected by the selection means, and causes the computed temperature to be displayed on the display means. When the temperature within the over chamber, detected by the temperature sensor, is not less than a reference temperature, the temperature of the water, computed by the control means, is equal to the reference temperature. And when the temperature within the oven chamber is less than the reference temperature, the temperature of the water is a value obtained by subtracting the oven chamber temperature from a value twice larger than the reference temperature.

The high-speed bread-making course comprises a kneading step of kneading dough while maintaining the temperature within the oven chamber at a fermentation temperature, a fermentation step of fermenting the dough while maintaining the temperature within the oven chamber at a fermentation temperature equal to the fermentation temperature of the kneading step, and a baking step of baking the dough after the fermentation step is finished, and there is provided control means for gradually increasing a kneading speed from a low speed for a predetermined time period from the start of the kneading step, and for bringing the kneading speed to a high speed upon lapse of the predetermined time period.

When the high-speed bread-making course is selected, the setting of a reservation timer is prohibited.

In the present invention, the kneading step is effected while maintaining the temperature within the oven chamber at the fermentation temperature, so that the dough, formed into a lump to a certain degree by the action of a kneading blade, begins to be fermented from the kneading step, and therefore the step of degassing the dough expanded by a primary fermentation step effected after the kneading step, and the subsequent step of again expanding the dough, which steps have been performed in a conventional device, can be omitted, and the time required for making bread can be greatly reduced. By providing a special bread-making course requiring such a shortened bread-making time, the user can easily make bread.

When selecting this short-time course, the temperature of water, which need attention, is automatically judged, and is displayed, and therefore bread can be made in a short time without fail.

For a predetermined time period from the start of the kneading step, the kneader is gradually accelerated so that the kneading speed can approach an ordinary high kneading speed while preventing the scattering of flour, and therefore the kneading time can be reduced. Thus, the temperature within the oven chamber is maintained at the fermentation temperature during the kneading step, and the kneading speed is gradually increased at the initial stage of the kneading step, and the temperature of water to be used is changed depending on the ambient temperature, and by doing so, the time, required for making bread, can be greatly reduced.

Therefore, in the present invention, bread can be made in a time less than a half of that required for the conventional device, and the bread can be eaten earlier. As a result of the reduced bread-making time, the running cost can be reduced. The temperature of the water to be prepared is automatically computed, and therefore bread of constant quality can be made in all seasons.

DESCRIPTION OF THE PREFERRED EMBODIMENTS

Figure 1:
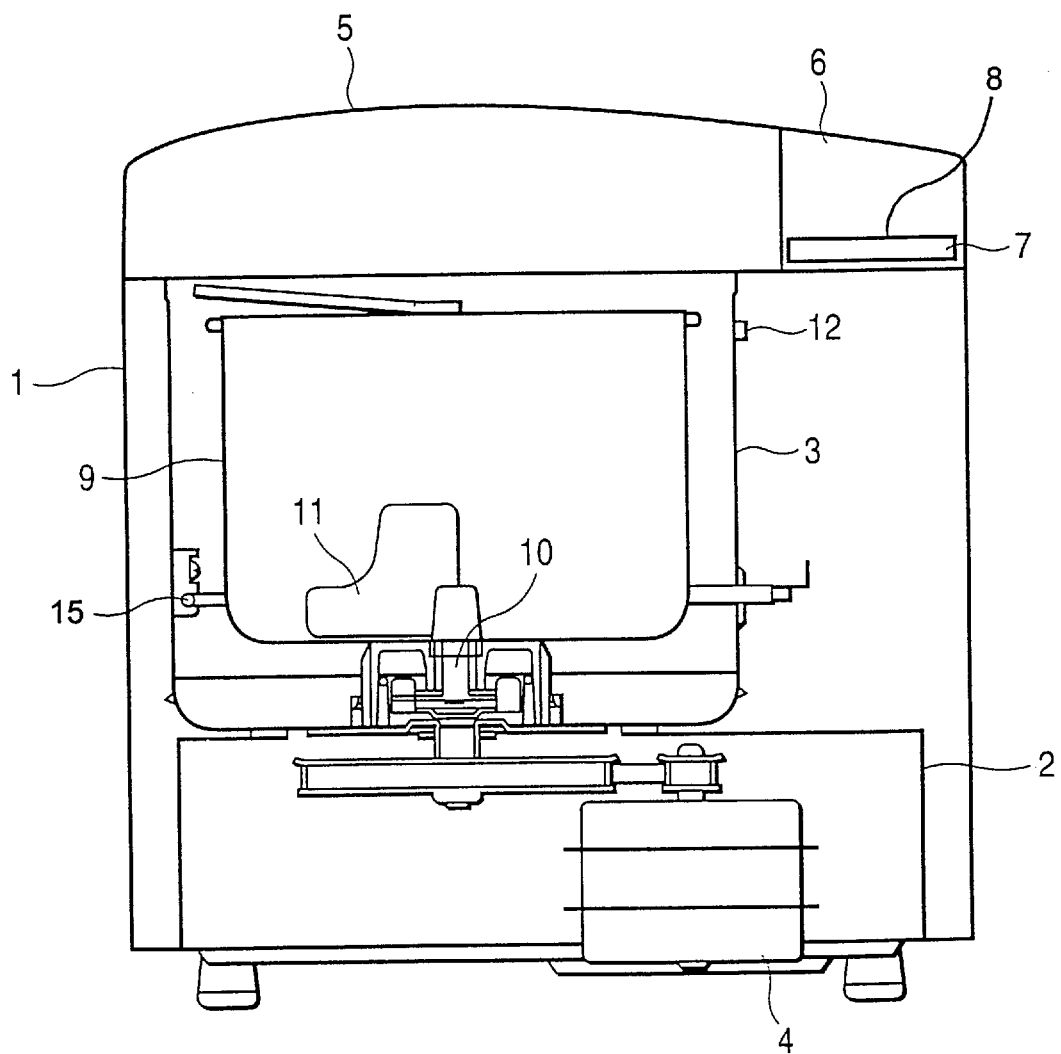
FIG. 1 is a cross-sectional view showing the interior of an automatic bread maker of the present invention.

A preferred embodiment of the present invention will now be described with reference to the drawings. In FIG. 1, a base 2 is fixedly mounted on a bottom of a bread maker body 1, and an oven chamber 3 is provided on an upper surface of the base 2, and a motor 4 is provided on a lower portion of the base 2. A lid 5 is openably and closably mounted at an upper side of the oven chamber 3. A board casing 6 is mounted above the motor 4, and contains a circuit board 7, and has an operation panel 8 mounted on an upper surface thereof.

A bread casing 9 of a rectangular horizontal cross-sectional shape, into which various kinds of ingredients can be charged, is removably mounted within the oven chamber 3. A rotation shaft 10 is provided in a projected manner at a central portion of a bottom of the bread vessel 9, and a kneading blade 11 is mounted on the rotation shaft 10. A temperature sensor 12 is mounted on an outer surface of the oven chamber 3. A heater 15 is substantially horizontally provided within the oven chamber 3 at a lower portion thereof in surrounding relation to the bread vessel 9.

Figure 2:
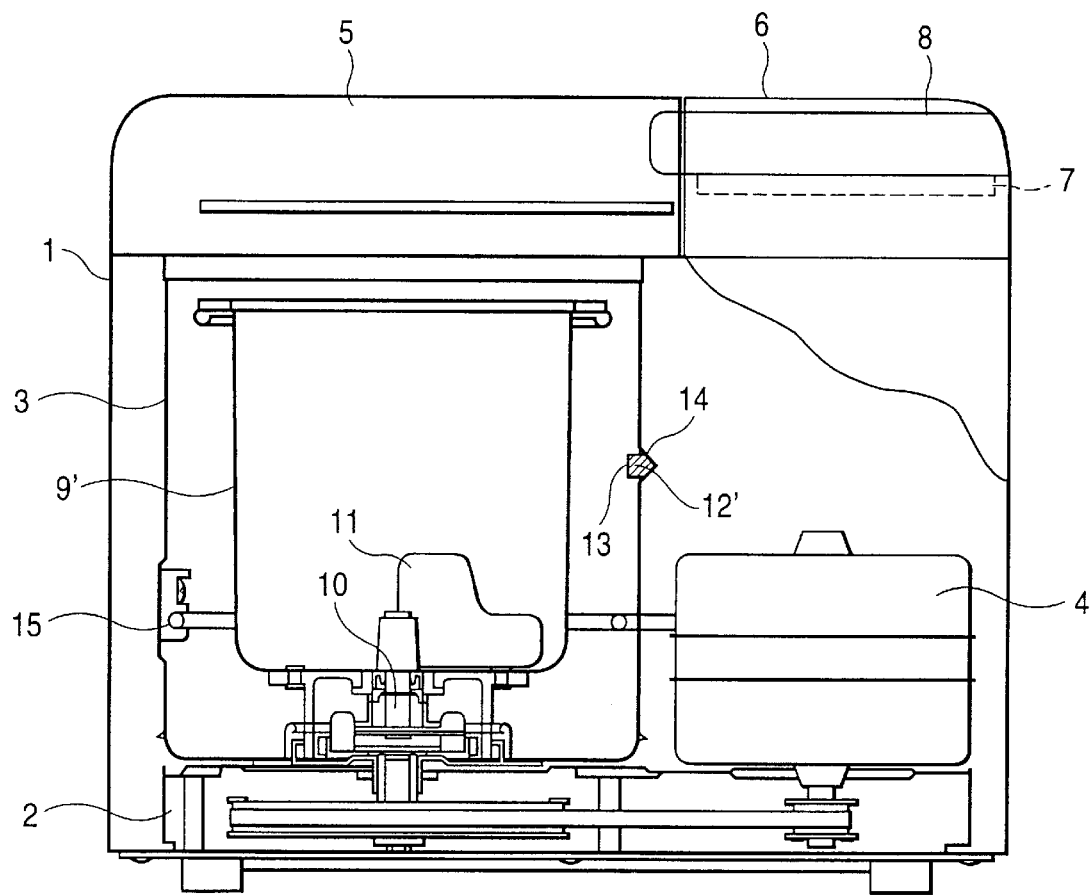
FIG. 2 is a cross-sectional view of another embodiment of an automatic bread maker of the invention.

FIG. 2 shows an automatic bread maker having a bread vessel 9' of a square horizontal cross-sectional shape, and this bread maker is similar to the above-mentioned bread maker of FIG. 1 except the configuration of the bread vessel and except that a temperature sensor 12' is fitted in a recess 13 formed in an outer surface of an oven chamber 3, and is fixed, with thermally-conductive grease filled, and is held in position by a fixing plate 14. The two bread makers are totally the same with respect to a control system and a bread-making operation described below.

Figure 3:
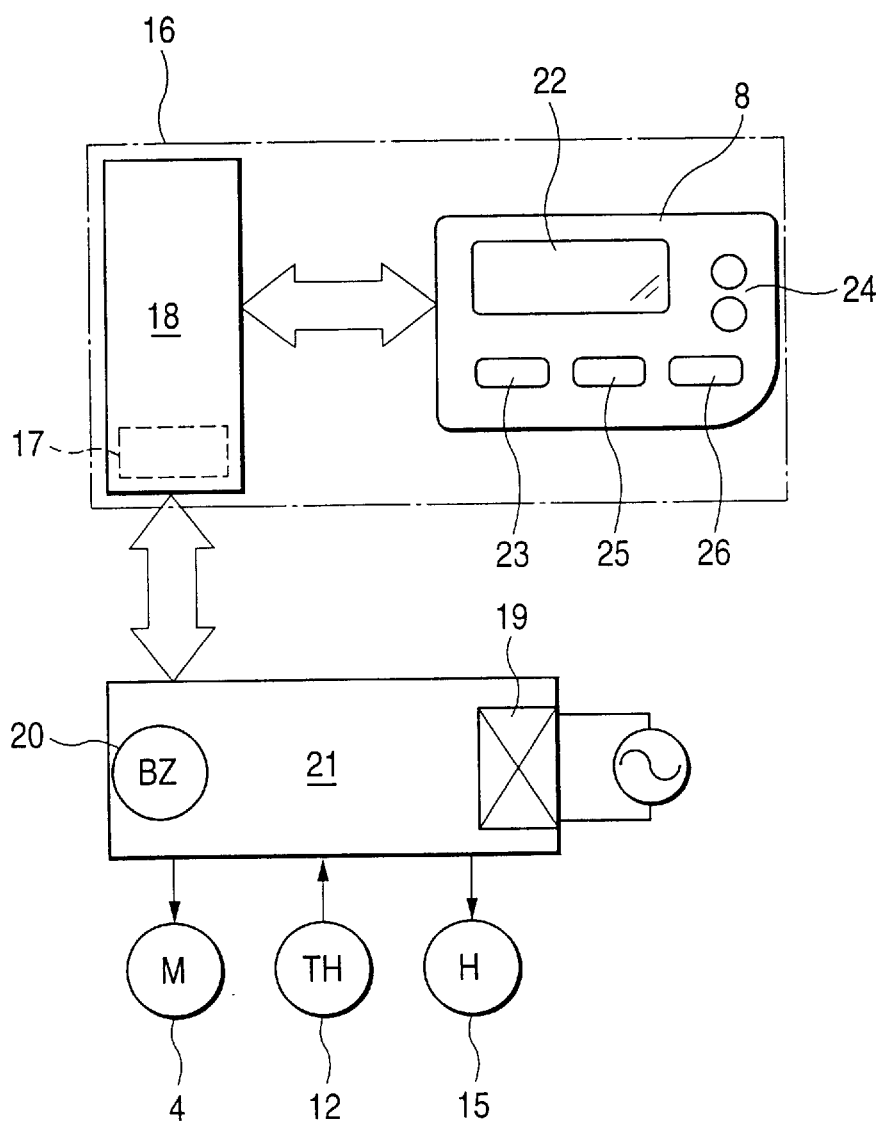
FIG. 3 is a block diagram showing a control system of the invention.

FIG. 3 shows a function block diagram of the invention, and a control portion 16 comprises a microcomputer 18 containing a memory 17, and a power board 21 having a transformer 19 and a buzzer 20. The motor 4, the temperature sensor 12, the heater 15 and the microcomputer 18 are connected to the power board 21, and the microcomputer 18 has an operation panel 8, and the control portion 16 is contained in the board casing 6.

The operation panel 8 is provided with a display portion 22 comprising an LCD, a menu key 23 for selecting a bread-making menu course, a timer key 24 for setting a time of a timer, a start key 25 for starting the operation, and a stop key 26 for stopping the operation. The bread-making menu, selected by the menu key 23, includes an ordinary bread course, a French bread course, a muffin course, a dough course and so on, and also includes a high-speed course for making bread within one hour, and bread-making programs, prepared respectively for these courses, are stored in the memory 17 in the microcomputer 18. When the menu key 23 is depressed repeatedly, numbers, corresponding respectively to the bread-making menu courses, are sequentially displayed on the display portion 22, and if the display is scrolled to that number corresponding to the high-speed course, and the start key 25 is depressed, the high-speed course is performed.

Incidentally, when the high-speed course is selected, the user can not operate the setting of the timer in this condition in order to positively effect the temperature control at the starting stage.

Figure 4:
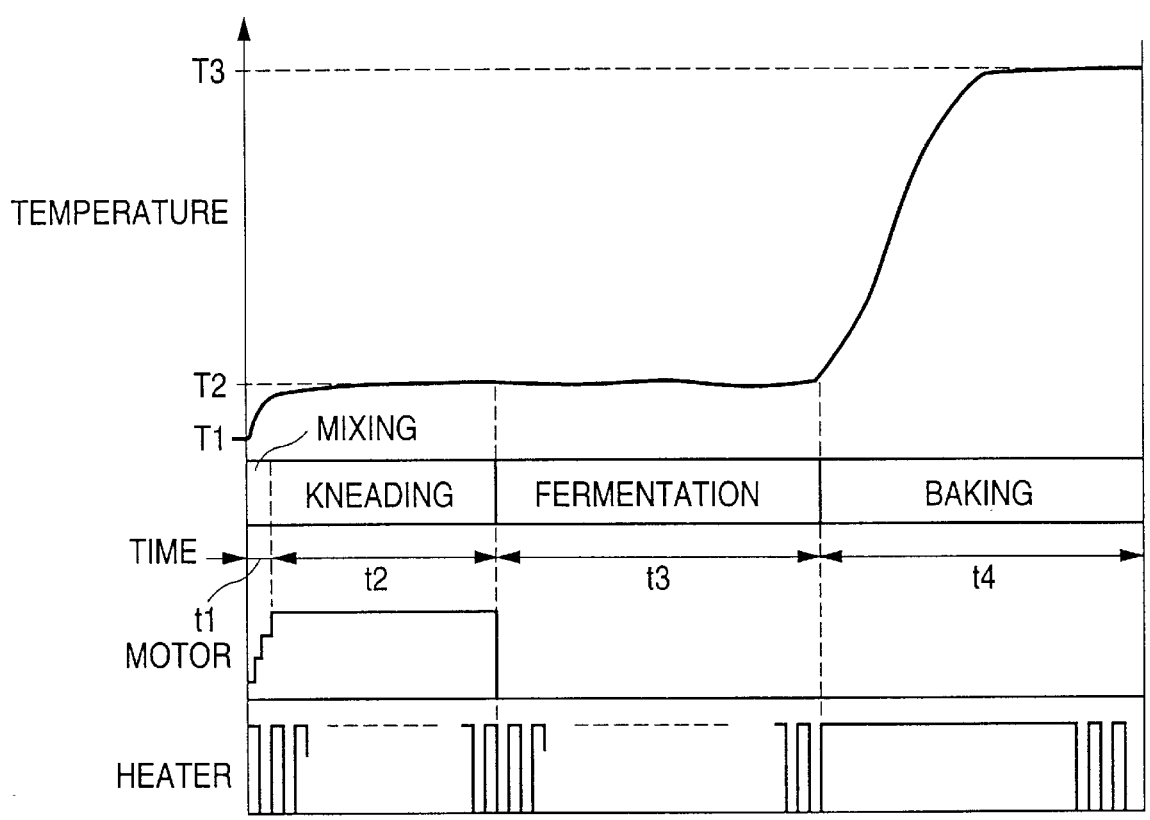
FIG. 4 is a time chart showing the operation of the invention.

FIG. 4 is a time chart showing the sequence of the high-speed course which is a feature of the present invention. Steps of the high-speed course will now be described with reference to FIG. 4.

First, when the shortened course is selected by the menu key 23, the temperature T1 within the oven chamber is detected by the temperature sensor 12, and this temperature T1 is compared with a reference temperature Ta, and if the relation, $Ta \leq T1$, is provided, it is judged that the temperature of the atmosphere is high, and therefore an instruction to prepare water of a temperature equal to the reference temperature Ta is displayed on the display portion 22 of the operation panel 8. If the relation, $Ta > T1$, is provided, it is judged that the temperature of the atmosphere is low, and therefore an instruction to prepare water of a temperature, determined by subtracting the detected temperature T1 from a value 2Ta (twice larger than the reference temperature Ta), is displayed on the display portion 22. This is effected in order to prevent variations in the finished bread due to the difference of the atmosphere temperature.

Incidentally, according to data obtained from results of tests conducted by Applicant of the present application, when the reference temperature Ta for judging the temperature of the water was set to 25° C., bread of constant quality was obtained regardless of the atmosphere temperature. According to this, when the temperature T1 within the oven chamber is 21° C. which is lower than the reference temperature Ta (25° C.), the temperature (2Ta−T1) of water to be prepared is represented by 25×2−21=29(°C.), and therefore it is necessary to prepare lukewarm water of 29° C.

When the start key 25 is depressed after the breadstuff is set in the bread casing 9, the motor 4 is driven to revolve the kneading blade 11, thereby starting a kneading step. During a predetermined time period t1 at an initial stage of the kneading step, the kneading blade 11 is gradually accelerated from a low speed to a medium speed. The purpose of this is to prevent parts of the breadstuff, separated therefrom at the initial stage of the kneading step, from being scattered, and also to impart a kneading motion to the food ingredients as much as possible during the shortened kneading time.

Upon lapse of the predetermined time t1, the kneading blade 11 revolves at high speed, and the kneading operation is effected for a time period t2. The temperature within the oven chamber 3 is continued to be monitored by the temperature sensor 12, and the heater is controlled to keep this temperature at a predetermined temperature T2. The predetermined temperature T2 is set to such a level as to facilitate the activity of yeast, and creates an environment in which the fermentation of the yeast is positively promoted during the kneading step. Namely, during the kneading step, the primary fermentation operation for bringing the interior of the oven chamber 3 to a fermentation temperature so as to ferment the dough is effected concurrently with a degassing operation for dispersing gas, produced by the fermentation, in the dough. Therefore, subsequent steps are simplified, so that the required time can be greatly reduced.

When this kneading step is finished, the motor 4 is stopped to stop the kneading operation, but the temperature sensor 12 continues to control the heater so as to maintain the fermentation temperature T2. In this condition, a fermentation step is carried out for a time period t3, thereby effecting a shaping-fermentation step of expanding the dough into a final shape of the bread. Therefore, after the kneading step is finished, the motor 4 is not operated, and the shaping-fermentation is effected without effecting the degassing.

After the fermentation step is finished, a baking step is effected for baking the dough expanded into the bread shape. In this step, in order to rapidly stop the activity of the yeast, the heater 15 is continuously energized to abruptly raise the oven chamber temperature to a predetermined baking temperature T3. This baking step is effected at a higher baking temperature and for a shorter time period t4 as compared with an ordinary bread-making course.

Preferably, the sum of the times t1 to t4 of the steps of this high-speed course is not more than one hour, and the fermentation temperature T2 is set to around 30° C., and the baking temperature T3 is set to around 150° C. When loafs of bread were made according to recipes shown in Table 1, using the high-speed course, tasty bread was prepared.

TABLE 1

| | RECIPE | | |
|---|---|---|---|
| INGREDIENTS | Small (1 lb) | Regular (1.5 lb) | Large (2 lb) |
| Bread flour | 260 g | 390 g | 520 g |
| Salt | 3.1 g | 5 g | 6.3 g |
| Butter or Margarine | 15 g | 24 g | 36 g |
| Dry Milk | 4.5 g | 6 g | 9 g |
| Sugar | 20 g | 30 g | 40 g |
| Fast Rise Dry Yeast | 7 g | 10.5 g | 14 g |
| Lukewarm Water | 180 cc | 270 cc | 360 cc |

What is claimed is:

1. An automatic bread maker comprising:
   an oven chamber having a heater, a kneader and a temperature sensor;
   a bread vessel mounted within the oven chamber, ingredients being put into the bread vessel; and
   a controller, for controlling the heater to maintain the temperature within the oven chamber, as detected by the temperature sensor, at a fermentation temperature during kneading and fermenting.

2. An automatic bread maker comprising:
   an oven chamber having a heater, a kneader, and a temperature sensor;
   a bread vessel mounted within the oven chamber, ingredients being put into the bread vessel in proportions to form a dough;
   a memory that stores a high-speed bread-making process including sequentially performed steps of:
   kneading the dough while maintaining a temperature within the oven chamber at a fermentation temperature,
   fermenting the dough while maintaining the temperature within the oven chamber at a fermentation temperature substantially equal to the fermentation temperature of the kneading step, and
   baking the dough after the fermentation step is finished;
   a selection system for selecting the high-speed bread-making process from the memory; and
   a controller for controlling the heater and the kneader in accordance with the temperature within the oven chamber, as detected by the temperature sensor, when the high-speed bread-making course is selected by the selection means.

3. The automatic bread maker according to claim 1, wherein said ingredients include water further comprising:
   a display for displaying a current step of said kneading, fermenting, and baking steps, a bread-making time; and
   a water temperature calculator that computes a temperature of the water to be put into the bread vessel in accordance with the temperature within the oven chamber detected by the temperature sensor, said display displaying the computed temperature of the water to be put into the bread vessel.

4. The automatic bread maker according to claim 2, wherein said ingredients include water, further comprising:
   a display for displaying a current step of said kneading, fermenting, and baking steps, a bread-making time; and
   a water temperature calculator that computes a temperature of the water to be put into the bread vessel in accordance with the temperature within the oven chamber detected by the temperature sensor, when the high-speed bread-making course is selected by the selection means, said display displaying the computed temperature of the water to be put into the bread vessel.

5. The automatic bread maker according to claim 2, further comprising:
   a kneading controller for gradually increasing the kneading speed from a lower speed during a predetermined time period from the start of the kneading step, and for bringing the kneading speed to a higher speed at the end of the predetermined time period.

6. The automatic bread maker according to claim 1, wherein said ingredients include water, and when the temperature within the oven chamber detected by the temperature sensor, is not less than a reference temperature, the temperature of the water to be put into the bread vessel is computed by the controller as equal to the reference temperature, and when the temperature within the oven chamber is less than the reference temperature, the temperature of the water to be put into the bread vessel is computed by the controller as a value obtained by subtracting the oven chamber temperature from a value twice the reference temperature.

7. The automatic bread maker according to claim 2, further comprising:
   a timer setting system for prohibiting the setting of a reservation timer when the high-speed bread making process is selected.

8. The automatic bread maker according to claim 2, wherein said ingredients include water, and when the temperature within the oven chamber detected by the temperature sensor, is more than a reference temperature, the temperature of the water is computed by the controller as equal to the reference temperature, and when the temperature within the oven chamber is less than the reference temperature, the temperature of the water is computed by the controller as a value obtained by subtracting the oven chamber temperature from a value twice the reference temperature.

9. An automatic bread maker, comprising:
   an oven chamber;
   a bread vessel mounted within the oven chamber, ingredients being put into the bread vessel;
   a heater for heating the oven chamber;
   a kneading mechanism for kneading the ingredients;
   a temperature sensor for detecting the temperature within the oven chamber; and
   a controller, responsive to the temperature sensor, for controlling the heater to maintain the temperature within the oven at a temperature suitable for fermentation even while said kneader kneads the ingredients, and to maintain the same fermentation temperature within the oven chamber during fermentation.

10. The automatic bread maker according to claim 9, further comprising:

a water temperature calculator that computes a temperature of the water to be put into the bread vessel in accordance with the temperature within the oven chamber detected by the temperature sensor.

11. The automatic bread maker according to claim 10, wherein said water temperature calculator computes the temperature of the water to be put into the bread vessel as:

equal to a reference temperature when the temperature detected by the temperature sensor is not less than the reference temperature, and twice the reference temperature minus the temperature detected by the temperature sensor when the temperature detected by the temperature sensor is less than the reference temperature.

* * * * *

UNITED STATES PATENT AND TRADEMARK OFFICE
CERTIFICATE OF CORRECTION

PATENT NO. : 5,860,355
DATED : January 19, 1999
INVENTOR(S) : S. Takeda, et. al.

It is certified that error appears in the above-identified patent and that said Letters Patent is hereby corrected as shown below:

Column 5, line 63, after "water" insert --,--.

Signed and Sealed this

Eighth Day of February, 2000

Attest:

Q. TODD DICKINSON

Attesting Officer

Commissioner of Patents and Trademarks